(12) United States Patent
Ariyoshi

(10) Patent No.: US 6,439,605 B2
(45) Date of Patent: Aug. 27, 2002

(54) AIR BAG AND AIR BAG DEVICE

(75) Inventor: Katsuhiro Ariyoshi, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/725,893

(22) Filed: Nov. 30, 2000

(30) Foreign Application Priority Data

Dec. 8, 1999 (JP) .......................................... 11-349131

(51) Int. Cl.$^7$ .............................................. B60R 21/30
(52) U.S. Cl. ..................... 280/739; 280/740; 280/743.1
(58) Field of Search ................................ 280/729, 739, 280/740, 743.1, 743.2, 738

(56) References Cited

U.S. PATENT DOCUMENTS

| | | | | |
|---|---|---|---|---|
| 4,111,458 A | * | 9/1978 | Okada et al. | 244/138 R |
| 5,007,662 A | * | 4/1991 | Abramczyk et al. | 280/739 |
| 5,219,179 A | * | 6/1993 | Eyrainer et al. | 280/739 |
| 5,492,363 A | * | 2/1996 | Hartmeyer et al. | 280/739 |
| 5,560,649 A | * | 10/1996 | Saderholm et al. | 280/739 |
| 5,586,782 A | * | 12/1996 | Zimmerman et al. | 280/730.2 |
| 5,593,179 A | * | 1/1997 | Maruyama | 280/740 |
| 5,599,041 A | * | 2/1997 | Turnbull et al. | 280/729 |
| 5,603,526 A | * | 2/1997 | Buchanan | 280/739 |
| 5,697,641 A | * | 12/1997 | McGee et al. | 280/730.2 |
| 5,941,559 A | * | 8/1999 | Rudolf et al. | 280/729 |
| 6,032,977 A | * | 3/2000 | Reh et al. | 280/729 |
| 6,050,596 A | * | 4/2000 | Boerger | 280/739 |

FOREIGN PATENT DOCUMENTS

| | | |
|---|---|---|
| JP | 2-132555 | 11/1990 |
| JP | 3-281460 | 12/1991 |
| JP | 6-191370 | 7/1994 |
| JP | 7-329667 | 12/1995 |
| JP | 9-295545 | 11/1997 |
| JP | 10-44914 | 2/1998 |
| JP | 10-71904 | 3/1998 |

* cited by examiner

*Primary Examiner*—Paul N. Dickson
*Assistant Examiner*—Paul Royal, Jr.
(74) *Attorney, Agent, or Firm*—Kanesaka & Takeuchi

(57) ABSTRACT

An air bag is formed of a panel portion with a gas introducing port, a partition wall situated inside the panel portion for partitioning an inside of the panel portion into a first chamber located on a front side of an automobile and a second chamber located on a rear side of the automobile, a gas passage situated between the first chamber and the second chamber, and at least one vent hole formed in the panel portion at the second chamber. An air bag device includes, in addition to the air bag, a retainer for retaining the air bag, an inflator for expanding the air bag, and a lid for covering the retainer. In case a collision speed is small or the passenger is relatively small, the passenger can be received by the air bag with a soft touch. In case the collision speed is large or the passenger is large, the passenger can be securely received by the first and second chambers.

11 Claims, 5 Drawing Sheets

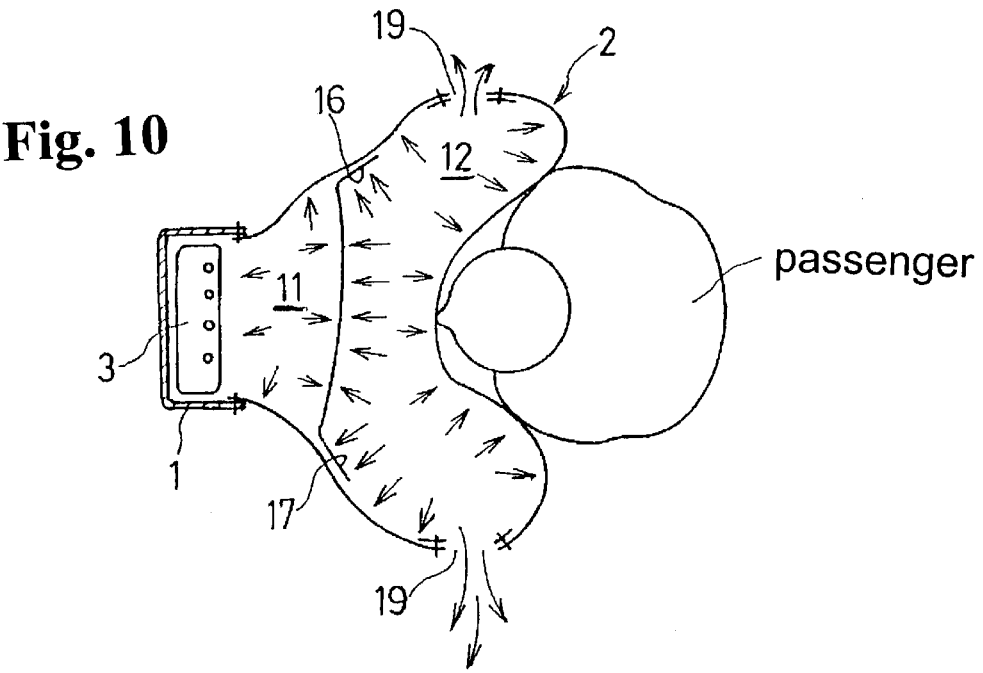
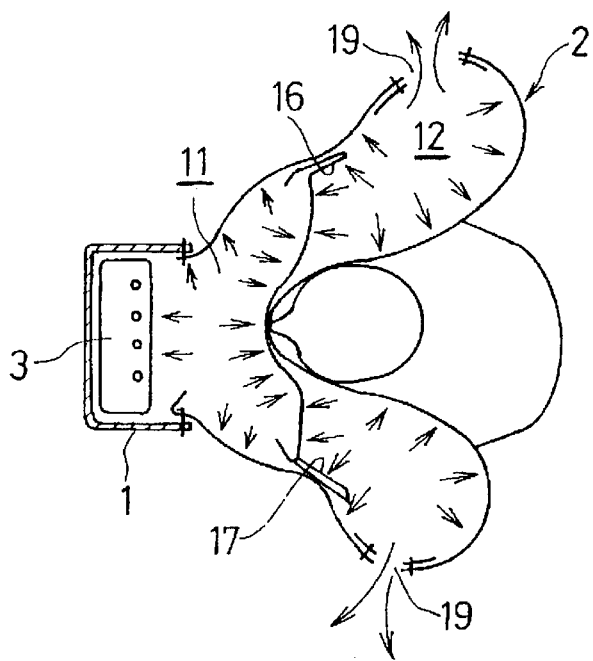
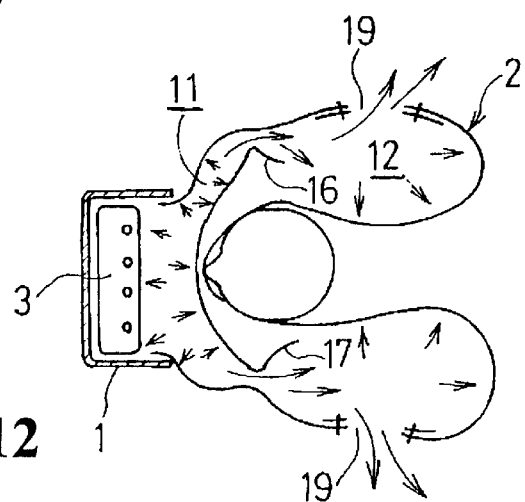

AIR BAG AND AIR BAG DEVICE

BACKGROUND OF THE INVENTION AND RELATED ART STATEMENT

The invention relates to an air bag for protecting a passenger in a vehicle, such as an automobile, at an emergency time, i.e. a collision, and an air bag device including the air bag. More particularly, it relates to an air bag having a plurality of chambers therein, and an air bag device thereof.

An air bag device, as well known, is a device for expanding an air bag for receiving a passenger therewith at a collision time of an automobile or the like. The air bag is provided with a vent hole, and when the passenger hits the expanded air bag very hard, a gas in the air bag gradually flows out through the vent hole to absorb an impact.

In case an automobile speed and a physical structure of a passenger are different, a kinetic energy to a forward direction of the passenger is also varied. Thus, an air bag device satisfying the following items (1) and (2) is ideal.

(1) In case the kinetic energy to the forward direction of the passenger is large, it is preferable that a bag resistance is made large, and energy absorbing stroke and time are made long; and (2) In case the kinetic energy to the forward direction of the passenger is relatively small, it is necessary to expand a bag to provide a small resistance against the passenger.

Japanese Utility Model Publication (KOKAI) No. 2-132555 discloses an air bag device, wherein an air bag is partitioned into two chambers separated in the vertical direction, a gas is introduced into an upper chamber through a lower chamber, and vent holes are provided to the upper side chamber. In the air bag device, at a time of collision of an automobile, first, a chest portion of the passenger is received by a first chamber having a high inner pressure, and then, a head portion of the passenger is received by a second chamber having a weak inner pressure. The air bag can not attain the above items (1) and (2).

It is an object of the invention to provide an air bag device, wherein when a passenger hits an air bag at a relatively low speed, the passenger is received by the air bag with a relatively soft touch, and in case the passenger hits the air bag at a relatively high speed, the passenger is securely received by the air bag at two stages.

Further objects and advantages of the invention will be apparent from the following description of the invention.

SUMMARY OF THE INVENTION

In the present invention, an air bag includes a gas introducing port, a partition wall for partitioning the air bag into a first chamber having the gas introducing port and disposed on a forward side of an automobile and a second chamber disposed on a rear side thereof, a gas passage for communicating between the first chamber and the second chamber, and a vent hole disposed at the second chamber. An air bag device includes, in addition to the air bag, a gas generator for supplying gas to the air bag.

In the air bag as described above, when the gas generator is operated at a time of collision of the automobile or the like, first, the first chamber expands, and then the second chamber is expanded by the gas passing through the gas passage. In case the passenger hits the expanded air bag, the gas gradually flows out through the vent hole from the second chamber, so that an impact energy is absorbed and the passenger is received by the second chamber with a relatively soft touch. Thus, when the passenger hits the air bag with a small speed, the passenger can be sufficiently received with only a gas flow-out from the second chamber.

In case the passenger hits the air bag with a high speed, a body of the passenger also presses the first chamber from the second chamber side through the partition wall. The gas in the first chamber flows into the second chamber through the gas passage and flows out through the vent hole. Since a gas flow-out resistance at this time is large, the passenger can be securely received by the first chamber. Of course, since the gas in the first chamber is drawn into the second chamber, the impact energy of the passenger is absorbed.

As described above, since the air bag is partitioned into the first and second chambers, the passenger can be received with different impact absorbing characteristics at two stages. Incidentally, the air bag may be partitioned into first, second and third chambers or more than that.

In the present invention, it is preferable to provide a gas reverse-flow preventing device for preventing the gas from reversely flowing from the second chamber to the first chamber. With the gas reverse-flow preventing device, in case the second chamber is pressed by the passenger, a gas-reverse flow from the second chamber to the first chamber can be prevented, and a gas flow quantity for flowing out from the second chamber through the vent hole can be rationalized to thereby properly absorb the impact energy of the passenger.

The gas reverse-flow preventing device is a valve formed of a sheet. The vent hole penetrates through the sheet constituting the valve. A circumference of the vent hole provided on the sheet may be united to the air bag. Thus, when the-gas in the first chamber flows out from the vent hole through the second chamber, a flow resistance becomes large and the passenger can be sufficiently received by the first chamber.

In the present invention, it is preferable that the gas passage is disposed only on an under surface side of the air bag, or on both sides and the under surface side of the air bag. Thus, when the gas flows into the second chamber from the first chamber, the gas mainly enters a lower side of the second chamber to thereby start expanding the second chamber from the lower side. As a result, a passenger facing surface of the air bag expands to approach the passenger from the lower side thereof.

In the present invention, it is preferable that the capacity of the second chamber is larger than that of the first chamber, so that most part of the impact is absorbed by the second chamber.

BRIEF DESCRIPTION OF THE DRAWINGS

FIG. 7 to FIG. 12 are explanatory views for explaining an air bag expanding operation.

DETAILED DESCRIPTION OF THE PREFERRED EMBODIMENTS

Figure 1:
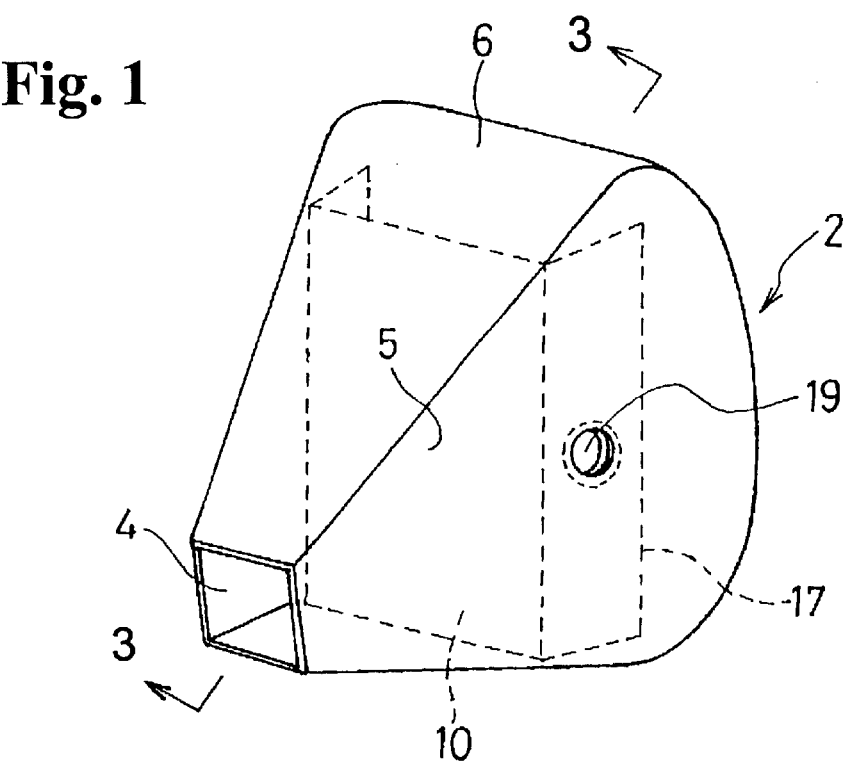
FIG. 1 is a perspective view of an air bag according to the present invention.
Figure 2:
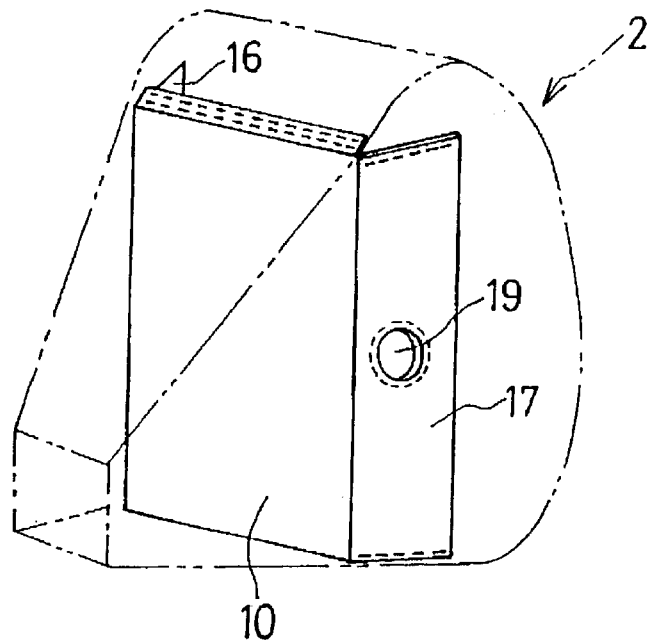
FIG. 2 is a seeing-through inner perspective view of the air bag of the invention.
Figure 3:
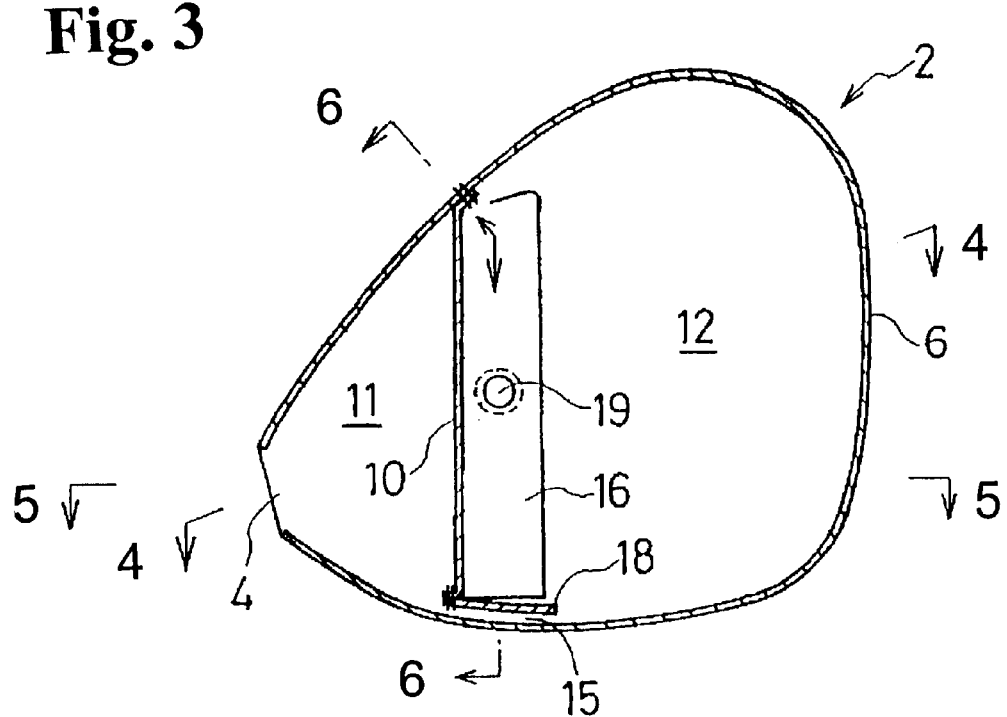
FIG. 3 is a sectional view taken along line 3—3 in FIG. 1.
Figure 4:
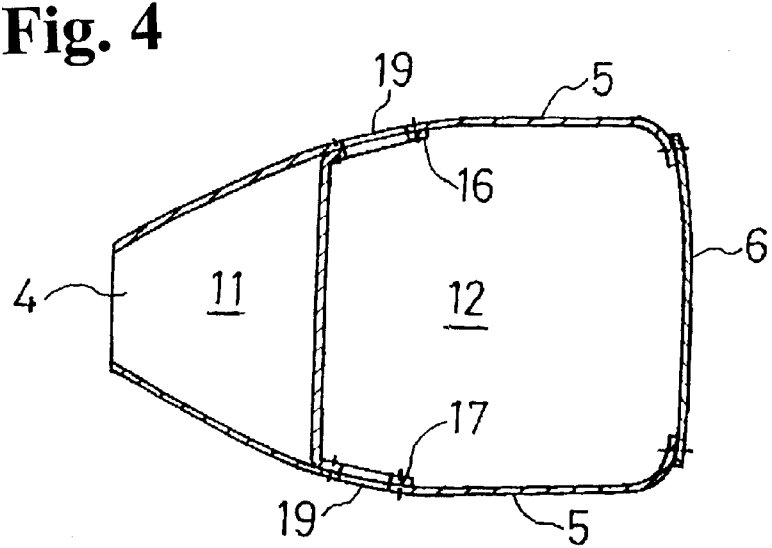
FIG. 4 is a sectional view taken along line 4—4 in FIG. 3.
Figure 5:
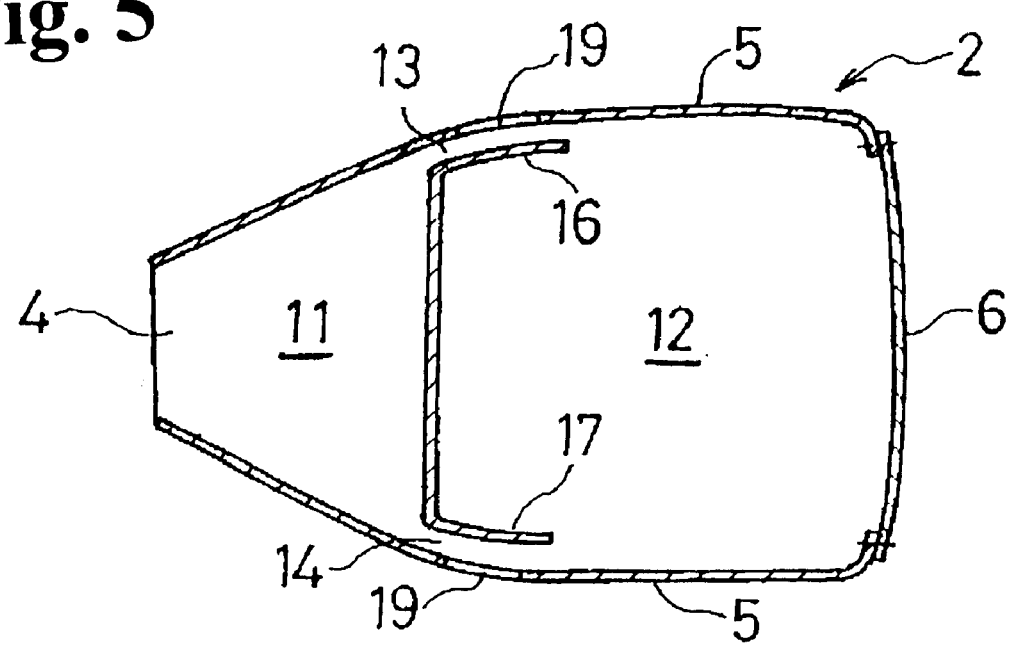
FIG. 5 is a sectional view taken along line 5—5 in FIG. 3.
Figure 6:
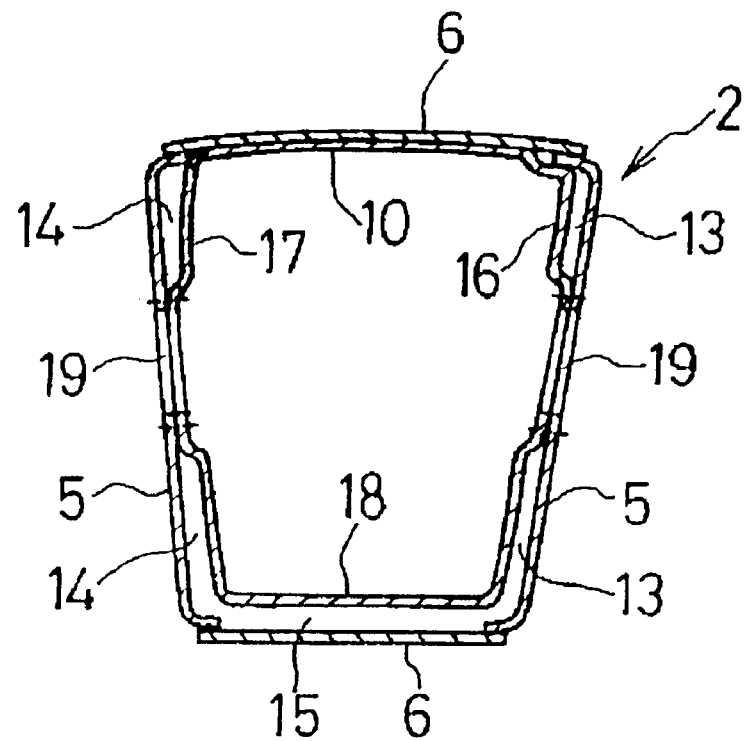
FIG. 6 is a sectional view taken along line 6—6 in FIG. 3.

Hereunder, with reference to the accompanying drawings, an embodiment of an air bag according to the present invention is explained. FIG. 1 is a perspective view of an embodiment of an air bag for a front passenger seat according to the invention; FIG. 2 is a seeing-through inner perspective view of the air bag for the front passenger seat according to the invention; FIG. 3 is a sectional view taken along line 3—3 in FIG. 1; FIG. 4 to FIG. 6 are sectional views taken along lines 4—4 to 6—6 in FIG. 3; and FIG. 7 to FIG. 12 are explanatory views of air bag expanding operations.

The air bag device includes a retainer 1 having a container shape, a front surface of which is open; an air bag 2 housed in the retainer 1; an inflator, i.e. gas generator, 3 for expanding the air bag 2; and a lid, not shown, for covering the front surface of the retainer 1. An edge portion of a gas introducing port 4 of the air bag 2 is attached to the retainer 1.

The air bag 2 has an outer or panel portion structured by a pair of side panels 5, and a front panel 6 formed of an upper surface, a passenger facing surface and a lower surface of the air bag 2 and surrounding outer circumferences of the side panels 5. The air bag 2 has a gas introduction port 4 at an end portion thereof.

The air bag 2 is divided into a first chamber 11 on a side of gas introducing port 4 and a second chamber 12 on a side facing a passenger by a partition wall 10 formed of a cloth or sheet extending in a vertical direction.

An entire upper side or flap of the partition wall 10 is sewed together with an upper surface of the air bag 2. Between the air bag 2 and both sides of the partition wall 10 and between the air bag 2 and a lower side of the partition wall 10, there are provided gas passages 13, 14, 15 communicating the first chamber 11 with the second chamber 12.

To prevent the reverse flow of the gas having passed through the gas passages 13, 14, 15, there are provided check valves 16, 17, 18 made of cloths or flaps. Base end sides of the respective check valves 16, 17, 18 are connected to the partition wall 10, and free end sides thereof extend into the second chamber 12.

The check valves 16, 17 on the both sides of the partition wall 10 face both side panels 5, respectively, and vent holes 19 are provided to pass through the check valves 16, 17 and the both side panels 5, respectively. The check valves 16, 17 are sewed together with the side panels 5 at circumferential portions of the respective vent holes 19 in a circular shape.

Incidentally, the partition wall 10 is disposed at a portion relatively close to the gas introducing port 4 so that even if the passenger hits the air bag very hard, the passenger does not substantially contact the partition wall 10. A capacity of the second chamber is larger than that of the first chamber.

Operations of the air bag device with the air bag thus structured are explained with reference to FIGS. 7 to 12. Incidentally, in order to make the drawings easily understandable, in FIGS. 7–12, the vent holes 19 are disposed away from the check valves 16, 17.

Figure 7:
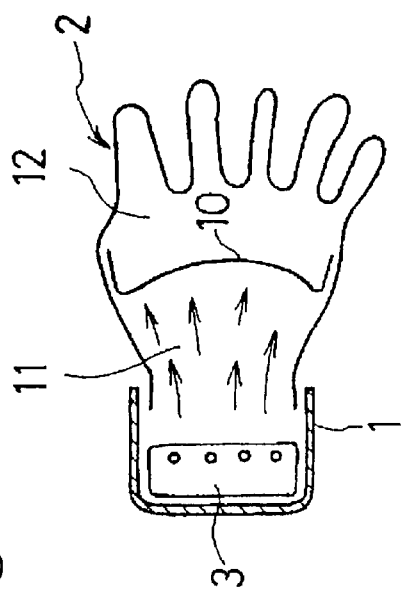
Figure 8:
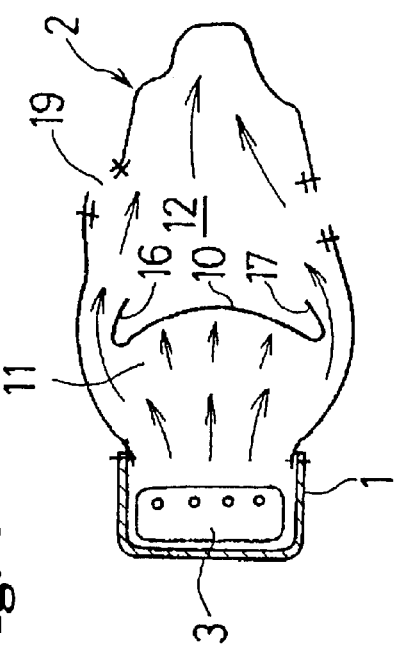

When a collision of an automobile is detected, the inflator 3 starts to eject a gas. The gas, as shown in FIG. 7, first expands the first chamber 11, and then expands the second chamber 12 through the gas passages 13, 14, 15 as shown in FIG. 8. At this time, the check valves 16, 17, 18 allow the gas to flow into the second chamber 12 through the gas passages 13, 14, 15.

Figure 9:
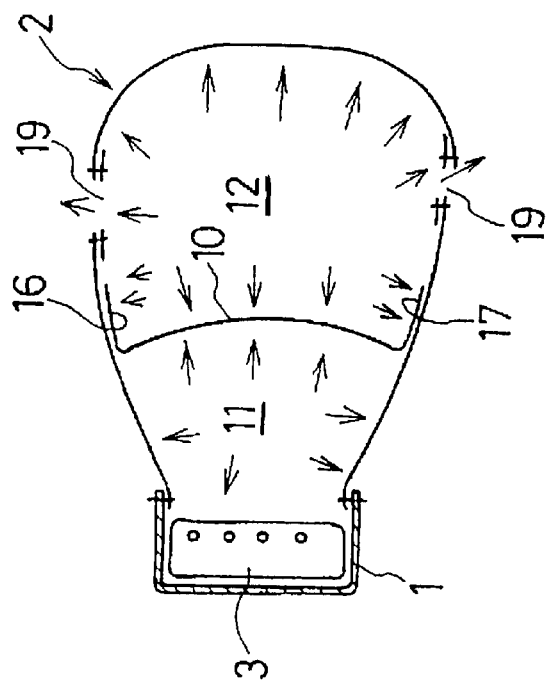

When a pressure in the second chamber 12 becomes a positive or appropriate pressure, as shown in FIG. 9, the check valves 16–18 are closed by the pressure.

As shown in FIG. 10, in case the passenger hits the expanded air bag 2, first, the gas in the second chamber 12 flows out through the vent holes 19, and an impact energy is absorbed. Although the pressure in the second chamber 12 is raised because of the passenger hitting the air bag, the check valves 16 to 18 remain closed, so that the reverse flow of the gas from the second chamber 12 to the first chamber 11 is prevented. The gas in the second chamber 12 flows outside the air bag 2 solely through the vent holes 19 to thereby absorb the impact energy of the passenger.

In case a collision speed of the automobile is small or the passenger is relatively small, the passenger is stopped at a state shown in FIG. 10 or right before a state shown in FIG. 11. During this period, since the gas in the second chamber 12 relatively easily flows out through the vent holes 19, the passenger is received by the second chamber 12 with a relatively soft touch.

In case the collision speed of the automobile is relatively large or the passenger is large, the passenger is further moved forward from the state shown in FIG. 10, and abuts against the partition wall 10, as shown in FIG. 11, to press the first chamber 11, too. Thus, an inner pressure in the first chamber 11 becomes higher than an inner pressure in the second chamber 12 to thereby open the check valves 16, 17, 18, so that the gas in the first chamber 11 flows out from the vent holes 19 through the second chamber 12. Thus, the impact energy of the passenger is further absorbed. Incidentally, since the gas in the first chamber 11 passes through the narrow gas passages 13, 14, 15, and further enters the check valves 16, 17, 18 to reach the vent holes 19, an exhausting speed of the gas in the first chamber 11 is smaller than that of the gas in the second chamber 12 as shown in FIG. 10. Therefore, the speed for crushing the first chamber 11 is small to thereby positively receive the passenger thereat.

As described hereinabove, according to the air bag, the impact energy of the passenger can be sufficiently absorbed. Also, in case the collision speed is small or the passenger is relatively small, the passenger can be softly received by the air bag. Also, in case the collision speed is large or the passenger is large, the passenger can be securely received by the air bag.

In the present embodiment, the gas passages 13, 14, 15 are disposed on both sides and the lower surface side of the air bag 2, the lower side of the second chamber 12 starts expanding first, and a forward edge surface, i.e. passenger facing surface, of the air bag 2 expands in an inclined state. Incidentally, the gas passage may be provided only at the lower surface of the air bag 2.

In the present embodiment, since the vent holes 19 are provided to the check valves 16, 17, the exhausting speed of the gas from the first chamber 11 can be sufficiently made small. Also, since the check valves 16, 17 are sewed together with the side panels 5 around the vent holes 19, the check valves 16, 17 are positively positioned on the sides of the second chamber 12.

The air bag and the air bag device of the above embodiment are for the front passenger seat. However, the present invention can be also applied to a driver's seat air bag and rear seat air bags.

As described above, according to the present invention, the passenger can be received at plural stages with different impact absorbing characteristics. The impact energy of the passenger can be sufficiently absorbed. Also, in case the collision speed is small or the passenger is relatively small, the passenger can be softly received by the air bag. Further, in case the collision speed is large or the passenger is large, the passenger can be securely received at two stages.

While the invention has been explained with reference to the specific embodiments of the invention, the explanation is illustrative and the invention is limited only by the appended claims.

What is claimed is:

1. An air bag comprising:

an air bag panel portion with a gas introducing port, a partition wall situated inside the panel portion for partitioning an inside of the panel portion into a first chamber located on a front side of an automobile and having the gas introducing port, and a second chamber located on a rear side of the automobile, a gas passage situated between the first chamber and the second chamber, at least one vent hole formed in the panel portion at the second chamber, and a reverse-flow preventing device formed in the gas passage between the panel portion and the partition wall and situated between the first and second chambers for allowing a gas to flow from the first chamber to the second chamber and preventing the gas from flowing from the second chamber to the first chamber, said reverse-flow preventing device being a valve made of a sheet, said at least one vent hole passing through the panel portion and the sheet of the valve, which are sewed together around a circumferential portion of the vent hole.

2. An air bag according to claim 1, wherein said partition wall is a flexible sheet having a main portion for separating the first and second chambers, and a plurality of flaps extending from the main portion, at least one of the flaps extending toward the second chamber to form the reverse-flow preventing device between the flap and a part of the panel portion situated adjacent thereto.

3. An air bag according to claim 2, wherein said flexible sheet has upper, lower and two side flap portions, said upper flap portion being fixed to the panel portion, and two side flap portions being at least partly fixed to the panel portion.

4. An air bag according to claim 1, wherein said gas passage is provided on only a lower surface side of the panel portion, or on only the lower surface side and two lateral sides of the panel portion.

5. An air bag according to claim 1, wherein said second chamber has a capacity greater than that of the first chamber.

6. An air bag device comprising the air bag according to claim 1 and an inflator for supplying a gas into the air bag to expand the same.

7. An air bag comprising:

an air bag panel portion with a gas introducing port, a partition wall situated inside the panel portion for partitioning an inside of the panel portion into a first chamber located on a front side of an automobile and having the gas introducing port, and a second chamber located on a rear side of the automobile, said partition wall being a flexible sheet having a main portion for separating the first and second chambers and upper, lower and two side flap portions extending from the main portion, said upper flap portion being fixed to the panel portion, and said two side flap portions being at least partly fixed to the panel portion, a gas passage situated between the first chamber and the second chamber, at least one vent hole formed in the panel portion at the second chamber, and a reverse-flow preventing device formed in the gas passage between the panel portion and the partition wall and situated between the first and second chambers for allowing a gas to flow from the first chamber to the second chamber and preventing the gas from flowing from the second chamber to the first chamber, at least one of the flap portions extending toward the second chamber to form the reverse-flow preventing device between the flap portion and a part of the panel portion situated adjacent thereto.

8. An air bag according to claim 7, wherein said at least one vent hole is formed in the side flap portion and the panel portion to penetrate therethrough, said side flap portion and the panel portion being fixed together around the at least one vent hole.

9. An air bag according to claim 8, wherein said lower flap portion is disposed over the panel portion without being fixed thereto.

10. An air bag comprising:

an air bag panel portion with a gas introducing port, a partition wall situated inside the panel portion for partitioning an inside of the panel portion into a first chamber located on a front side of an automobile and having the gas introducing port, and a second chamber located on a rear side of the automobile, said partition wall being a flexible sheet having a main portion for separating the first and second chambers and a plurality of flaps extending from the main portion and located adjacent the panel portion, at least one of the flaps extending toward the second chamber adjacent the panel portion, a gas passage situated between the first chamber and the second chamber, at least one vent hole formed in the panel portion at the second chamber, and a reverse-flow preventing device formed in the gas passage between the panel portion and the partition wall and situated between the first and second chambers for allowing a gas to flow from the first chamber to the second chamber and preventing the gas from flowing from the second chamber to the first chamber, said at least one of the flaps extending toward the second chamber forming the reverse-flow preventing device between said at least one of the flaps and a part of the panel portion situated adjacent thereto so that in a condition that the air bag is fully opened, when the second chamber is pushed, the gas in the second chamber is ejected through the at least one vent hole, and when the partition wall is pushed through the second chamber toward the first chamber at a pressure greater than that in the first chamber, the gas in the first chamber is ejected outside the air bag through the reverse-flow preventing device and the at least one vent hole to thereby absorb impact at plural stages.

11. An air bag according to claim 10, wherein said plurality of flaps forms the reverse-flow preventing device between each of the flaps and the panel portion.

* * * * *